(No Model.)

J. PFLEGER.
VELOCIPEDE.

No. 479,839. Patented Aug. 2, 1892.

Witnesses.
A. U. Opsahl.
E. F. Elmore.

Inventor.
John Pfleger
By his Attorney
Jas. P. Williamson

UNITED STATES PATENT OFFICE.

JOHN PFLEGER, OF MINNEAPOLIS, MINNESOTA.

VELOCIPEDE.

SPECIFICATION forming part of Letters Patent No. 479,839, dated August 2, 1892.

Application filed November 17, 1891. Serial No. 412,129. (No model.)

*To all whom it may concern:*

Be it known that I, JOHN PFLEGER, a citizen of the United States, residing at Minneapolis, in the county of Hennepin and State of Minnesota, have invented certain new and useful Improvements in Velocipedes; and I do hereby declare the following to be a full, clear, and exact description of the invention, such as will enable others skilled in the art to which it appertains to make and use the same.

My invention relates to velocipedes; and it consists in certain novel devices and combination of devices which will be hereinafter fully described, and particularly pointed out in the claims.

A velocipede embodying my invention is shown in the accompanying drawings.

Figure 1:
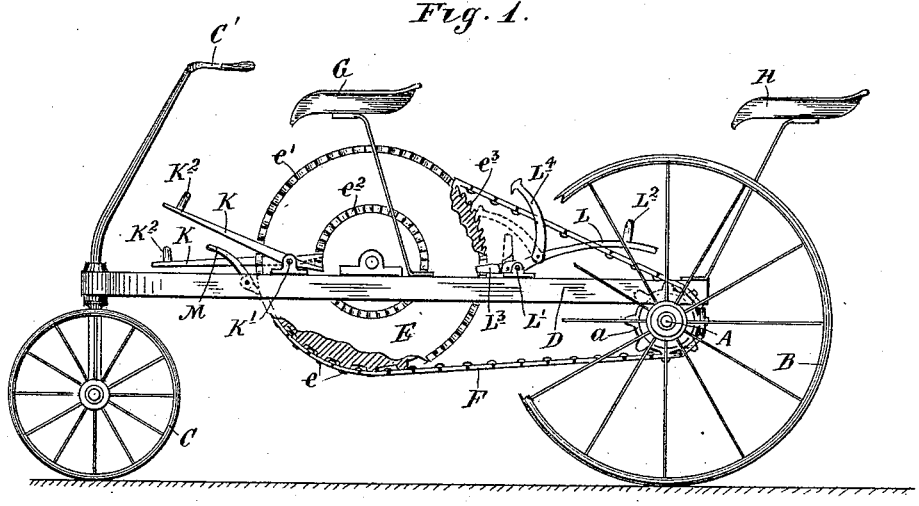
Figure 2:
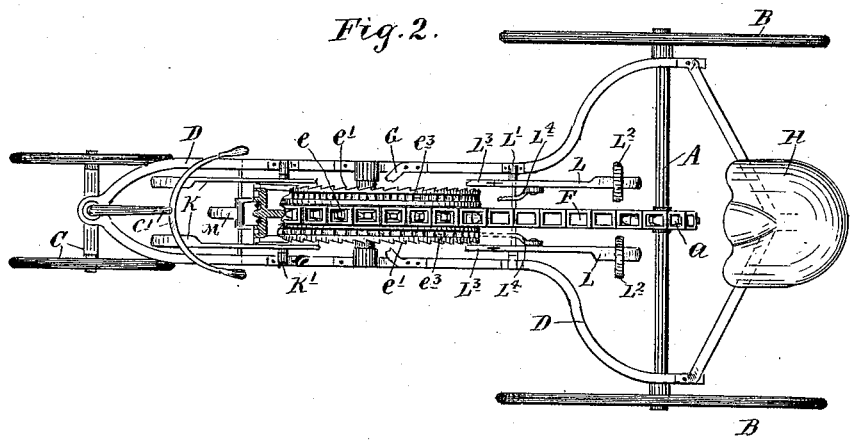

Therein, like letters referring to like parts throughout, Figure 1 is a left side elevation of the machine, some parts being broken away; and Fig. 2 is a plan view of the same.

A is the axle, and B the wheels, of the rear or main supporting-truck.

C is a steering-truck provided with the steering-handle C', the said truck having a pivotal connection with the main frame.

D is the main frame.

E is a drive-wheel supported on the main frame, free from the ground, between the two trucks. This drive-wheel has on its periphery an annular sprocket $e$, which is connected by a sprocket-chain F with a sprocket-wheel $a$, fixed to the rear truck-axle. Hence any motion imparted from the drive-wheel will be communicated to the rear trucks of the velocipede. The drive-wheel has on both margins of its periphery a set of ratchet-wheels $e'$, arranged for the forward motion of the wheel and the machine. Concentric with the said marginal ratchets on the side faces of the wheel are another set of ratchets $e^2$, with teeth arranged for the backward motion of the wheel or the machine. On the periphery of the drive-wheel is still another ratchet $e^3$, which is also arranged for backward motion of the wheel. Supported from the main frame above and toward the front of the drive-wheel is a seat G for the rider and operator, and supported from the rear part of the frame at some distance behind the drive-wheel is another seat H.

Arranged for action at the front of the drive-wheel by the operator on the front seat is a pair of foot-power ratchet-levers K, fulcrumed to the main frame, as shown at K', and provided with stirrups as shown at K². The rider on the front seat can reach and operate this set of ratchet-levers K and make the same engage either with the marginal ratchets $e'$ or the inside ratchets $e^2$ at will. The pawl-levers are pivoted loosely, so as to be capable of sufficient lateral motion to permit the change from one ratchet to another. When operating the ratchet-levers for the forward motion of the machine, a part of the levers on the foot side of the fulcrum engages with the marginal ratchets $e'$, and when operating the same to drive the wheel in the other direction the ratchet-levers are swung laterally at their forward ends by the operator, so as to clear the marginal ratchet $e'$ and cause their rear ends to engage with the ratchet $e^2$.

To enable the rider on the rear seat H to assist in propelling the machine, another set of ratchet-levers L are pivoted to the main frame, as shown at L', for action on certain of the ratchets from the rear of the drive-wheel. The long arms of these levers L have stirrups L² within reach of the rider on the rear seat. The front arm L³ is pivotally connected to the main lever and when in its normal position will engage under the teeth of the marginal ratchets $e'$ to assist in the forward motion of the machine. When it is desired to reverse the direction, the pivoted part L³ is turned backward by hand and a hook-section L⁴ is thrown forward, so as to engage with the teeth of the peripheral ratchet $e^3$.

It is evident from the construction that the riders on the two seats may join in the propulsion of the drive-wheel through the respective foot-power ratchet-levers above described acting on the front of the drive-wheel.

A brake M is pivoted to the frame in front of the drive-wheel and has its shoe portion arranged for action on the peripheral flanges of the wheel on the opposite sides of the sprocket-chain. This brake is in position for operation by the rider on the front seat. The arms C' of the steering-truck C project to within convenient reach of the rider on the front seat, so that he may steer the machine as he desires.

What I claim, and desire to secure by Letters Patent of the United States, is as follows:

1. In a velocipede, the combination, with a driving-wheel provided with annular ratchets arranged for moving the wheel in opposite directions, of ratchet-levers engageable with either set of said ratchets at the will of the operator, substantially as described.

2. In a velocipede, the combination, with a drive-wheel supported on the main frame free from the ground and provided with annular ratchets, some of which have their teeth arranged for forward and others for backward motion, of seats for two operators, and two sets of foot-power ratchet-levers arranged for action on said ratchets at opposite points of the driving-wheel, substantially as described.

3. In a velocipede, the combination, with the drive-wheel supported on the main frame free of the ground and provided with annular ratchets, of the foot-power ratchet-levers and a foot-power brake operating on said drive-wheel, substantially as described.

4. In a velocipede, the combination, with a drive-wheel supported on the main frame free from the ground and provided with annular ratchets, some of which have their teeth arranged for forward and others for backward motion, of seats for two operators, arranged one to the front and the other to the rear of the driving-wheel, and two sets of foot-power ratchet-levers arranged for action on said ratchets at opposite points of the said driving-wheel for either forward or backward motion, substantially as described.

In testimony whereof I affix my signature in presence of two witnesses.

JOHN PFLEGER.

Witnesses:
JAS. F. WILLIAMSON,
EMMA F. ELMORE.